S. BABCOCK.
STORAGE CABINET FOR SEED CORN.
APPLICATION FILED DEC. 22, 1908.
931,669.
Patented Aug. 17, 1909.
2 SHEETS—SHEET 1.
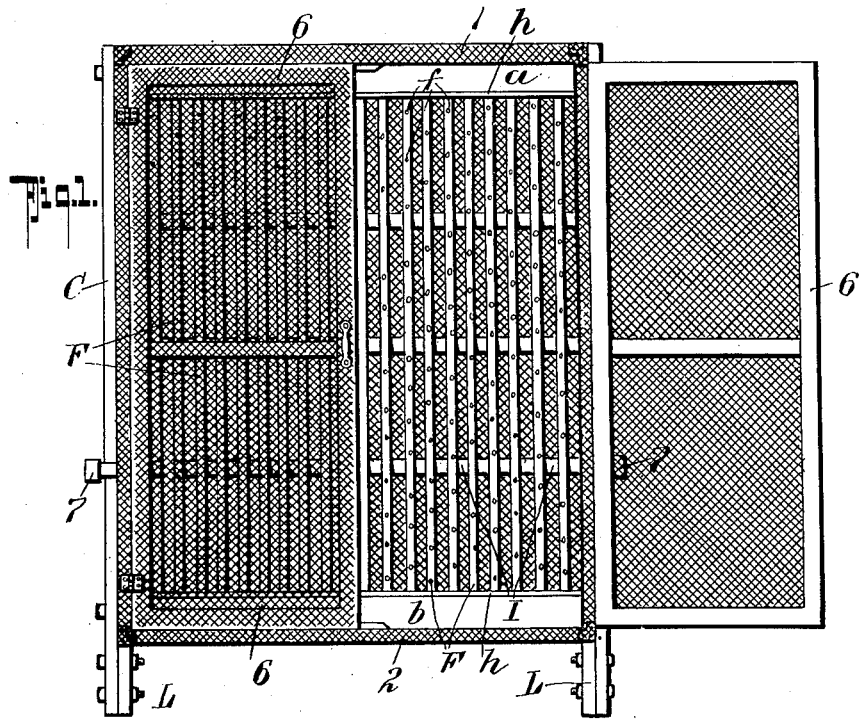
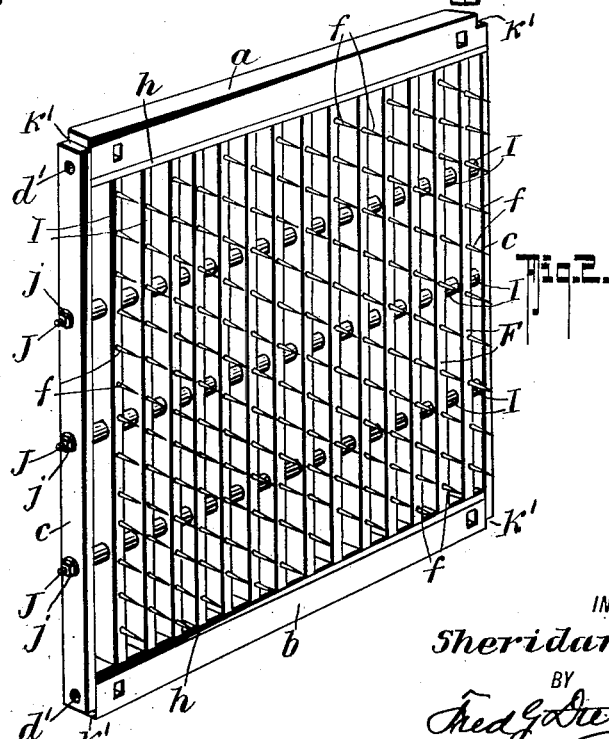
WITNESSES:
H. Woodard
M. Immuch
INVENTOR
Sheridan Babcock
BY
Fred G. Dieterich
ATTORNEYS S. BABCOCK.
STORAGE CABINET FOR SEED CORN.
APPLICATION FILED DEC. 22, 1908.
931,669.
Patented Aug. 17, 1909.
2 SHEETS—SHEET 2.
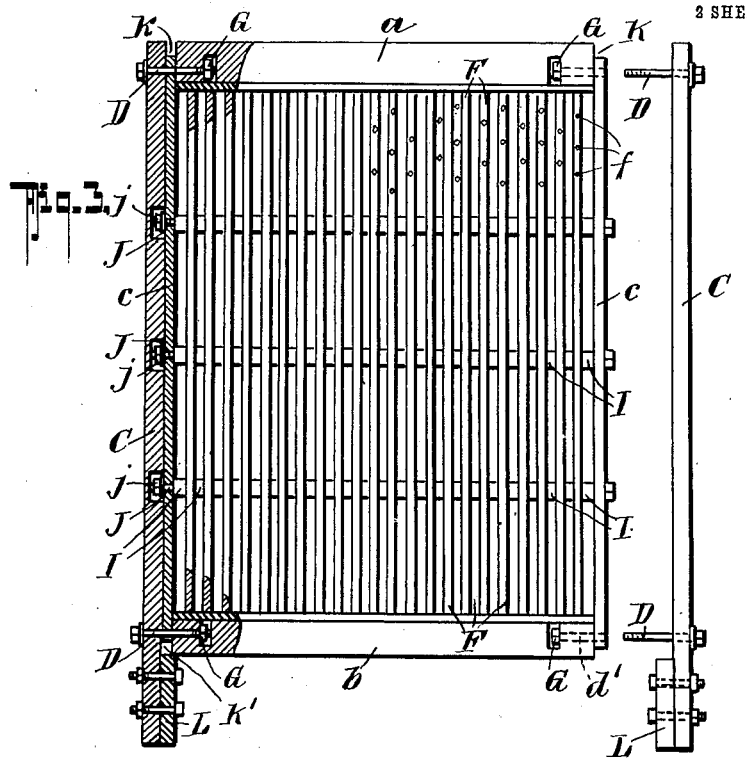
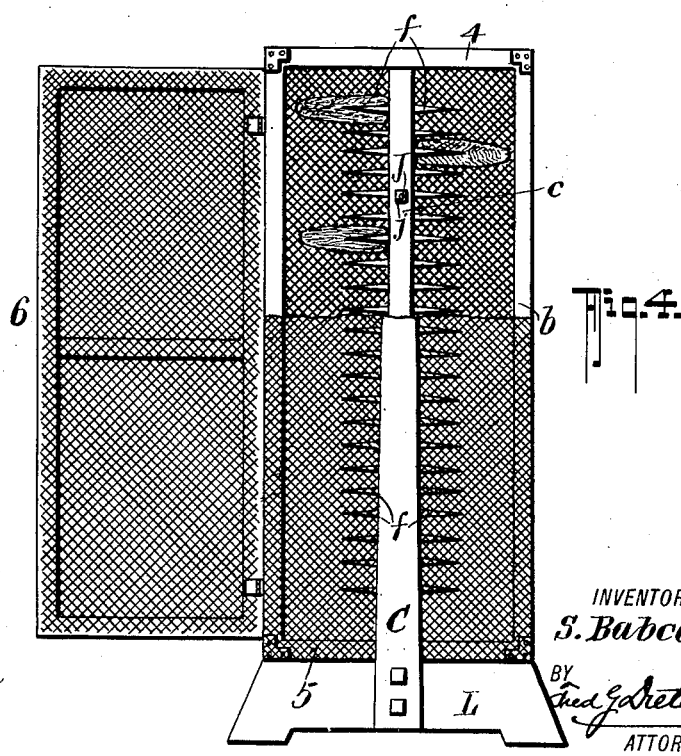
WITNESSES:
H. Woodard
M. E. Immich
INVENTOR
S. Babcock
BY
Fred G. Dieterich
ATTORNEYS

UNITED STATES PATENT OFFICE.

SHERIDAN BABCOCK, OF OWASA, IOWA.

STORAGE-CABINET FOR SEED-CORN.

No. 931,669.　　　Specification of Letters Patent.　　　Patented Aug. 17, 1909.

Application filed December 22, 1908. Serial No. 468,764.

*To all whom it may concern:*

Be it known that I, SHERIDAN BABCOCK, residing at Owasa, in the county of Hardin and State of Iowa, have invented a new and improved Storage-Cabinet for Seed-Corn, of which the following is a specification.

My invention has for its object to provide an improved means for storing seed corn until the time for planting and in such manner as to conserve all the vitality thereof as well as protecting it from rats or mice, and other rodents, and in its generic nature it comprehends a corn holding frame, including parallelly arranged slats suitably spaced apart and carrying transversely projected members for holding individual ears of corn projected from opposite sides of the frame, said frame also having such special construction of parts whereby a skeleton screen covered cabinet frame can be conveniently constructed around so as to thoroughly incase the same.

In its more subordinate features, my invention consists in certain details of construction and peculiar combination of parts, all of which will be hereinafter fully explained, specifically pointed out in the appended claims and illustrated in the accompanying drawings, in which:—

Figure 1, is a front elevation of my invention, one of the doors of the cabinet being shown open. Fig. 2, is a perspective view of the corn holding frame. Fig. 3, is an elevation of the holding frame, one end thereof being partly in section, and parts of the other end being shown detached, and, Fig. 4, is an end view of the cabinet, the screen over a portion being omitted to show the interior arrangement of part of the holding frame, one of the doors being shown swung open.

In the practical construction, my invention embodies a main frame that supports the corn in such manner that the ears are projected transversely therefrom to each side, and individually supported out of contact with each other to allow for a free circulation of air around each corn ear, and the said frame is supported within a skeleton cabinet like frame that is covered by a fine mesh screening to keep out the rats, mice and other rodents, as will be hereinafter more fully explained.

The corn supporting frame, which is shown in detail in Fig. 2, consists of a top bar *a* and a bottom cross bar *b* of sufficient thickness and strength to carry the weight of the corn. The upper and lower bars are connected by binding or side pieces *c—c* that are tightly clamped at their upper and lower ends against the ends of the bars *a* and *b* by a series of cross rods J, the ends of which carry clamp nuts *j j*, as shown.

F designates a series of vertically disposed parallel slats, the upper and lower ends of which are joined to cross cleats *h—h'* that are nailed or screwed to the inner edges of the cross bars *a* and *b*. The slats F are perforated for the passage of the cross rods J and they are held at the desired distances by the spacing washers I—I. The slats F have corn receiving prongs *f* in the nature of stiff wire pieces that pass through the slats and project at each side thereof, as best shown in Fig. 4 and to provide for a perfect circulation of air and the holding of a maximum number of the corn ears, the pins on the several slats are staggeredly arranged.

The upper bar *a* has notches *k—k* in the upper edge at the outer ends and the lower bar *b* has similar notches *k'* on the lower edges and these notches are provided to receive therein the upper and lower sets of cross members 1—1 and 2—2 of the skeleton cabinet frame, which members 1—1 and 2—2 connect at their outer ends with the vertical or corner posts 3—3, and the top and bottom sets of front and back cross pieces 4—4 and 5—5. The cabinet also includes two doors 6—6 that are hinged to the front corner posts and these doors as also the top, bottom, rear, side and ends are covered with a fine mesh wire screen.

C—C designate what I term the supporting standards of which there is one at each end of the cabinet and these carry at their lower ends on the inner side base or foot members L that are bolted to the standards C—C, project under the bottom of the skeleton frame and form the supporting base therefor. At the upper and lower ends the standards C—C have clamping bolts D—D that enter sockets *d—d* in the top and bottom bars *a* and *b* and engage the nuts G—G held therein.

7—7 designate handle pieces that are secured to each end of the cabinet and the standards for conveniently handling the cabinet when set up complete.

In building my invention, I first construct the corn holding frame, then build the skeleton frame around it and then cover the skeleton frame with the wire screen, the latter being put on beginning at one corner and going clear around the edge of the cabinet, using screen enough wider than the screen to cover the frame pieces. After the screen is applied the standards C are put in position and fastened, thus completing the structure.

From the foregoing, taken in connection with the drawings, the complete construction, the manner in which my invention is used and its advantages will be readily apparent to those skilled in the art to which it appertains.

By supporting the ears as shown, easy access thereto may be had through either side, both sides having doors, and a large number of the ears can be stored or removed without disturbing the others.

Having thus described my invention, what I claim is:

1. A corn storing apparatus that comprises a frame, consisting of a series of parallel slats, a top and bottom cross bar to which the ends of the slats are joined, means for holding the slats in open parallelism, pins that project outwardly from one or both edges of the slats, and standards secured to the ends of the upper and lower cross bars of the corn frame for supporting the said frame.

2. A corn storing apparatus that comprises a frame consisting of a series of parallel slats, a top and a bottom cross bar to which the ends of the slats are joined, means for holding the slats in open parallelism, pins that project outwardly from one or both edges of the slats, standards secured to the ends of the upper and lower cross bars of the corn holding frame and a screen covered skeleton frame that entirely surrounds the corn frame and is supported by the said frame and the standards.

3. A corn storing apparatus that comprises a frame consisting of a series of parallel slats, a top and a bottom cross bar to which the ends of the slats are joined, means for holding the slats in open parallelism, staggeredly arranged pins that project outwardly from one or both edges of the slats, standards secured to the ends of the upper and lower cross bars of the corn holding frame and a screen covered skeleton frame that entirely surrounds the corn frame and is supported by the said frame and the standards, the said skeleton frame including hinged doors.

4. In a corn storage apparatus, the combination with a corn holding frame consisting of a series of spaced vertically disposed slats having outwardly projecting pins at its edges for sustaining the corn ears thereon, and including an upper and a lower cross bar, said bars having their outer edges notched at the opposite ends, standards that are connected to the ends of the said frame, and a skeleton screen covered frame that surrounds the entire corn carrying frame, said skeleton frame including upper and lower sets of side bars that fit the notched ends of the upper and lower cross bars, transverse upper and lower bars that join with the ends of the side bars, hinged doors connected to the side bars, and a screen covering for the entire skeleton frame, said frame being supported by the standards that support the corn frame.

SHERIDAN BABCOCK.

Witnesses:
C. H. BURLINGAME,
T. A. THAYER.